May 23, 1939.　　　　　G. LEVY　　　　　2,159,484

VENT VALVE FOR STEAM HEATING RADIATORS

Filed Oct. 26, 1937

INVENTOR
GUSTAVE LEVY
BY
W.R. Lieberman
ATTORNEY

Patented May 23, 1939

2,159,484

UNITED STATES PATENT OFFICE 2,159,484

VENT VALVE FOR STEAM HEATING RADIATORS

Gustave Levy, Weehawken, N. J.

Application October 26, 1937, Serial No. 171,033

1 Claim. (Cl. 137—122)

My invention involves an improvement in vent valves for steam heating radiators, and relates particularly to a device that automatically varies the amount of steam vented from the valves used on radiators in steam heating systems. The opening of the vent increases with increasing pressures, which rate of increase can be varied, and the main object of my invention is the provision of a device to vary the amount of steam emitted from radiators at various pressures, and to increase or decrease this steam at any desired pressures.

Further objects will in part be obvious from the following description of an illustrative embodiment of my invention, and others will be specifically pointed out hereinbelow.

In the drawing annexed hereto, forming a part hereof,

Figure 1:
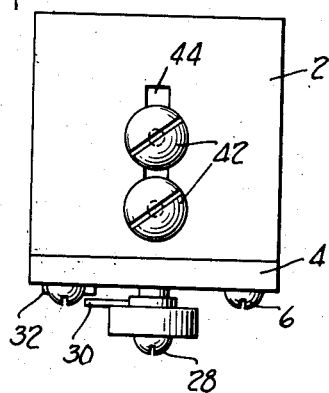
Figure 1 is a plan view of one form of device constructed according to and embodying my invention.
Figure 2:
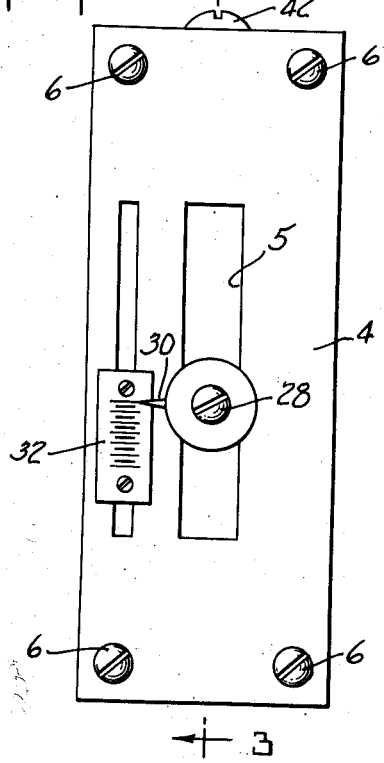
Fig. 2 is a front elevational view thereof.
Figure 3:
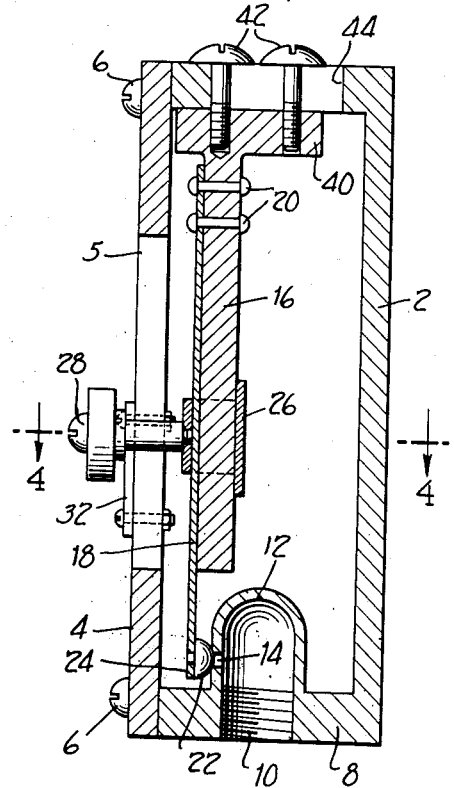
Fig. 3 is a vertical section along the line 3—3 of Fig. 2.
Figure 4:
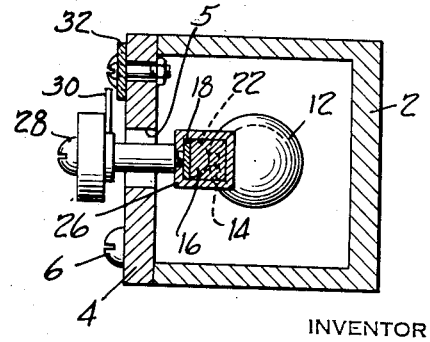
Fig. 4 is a horizontal section along the line 4—4 of Fig. 3.

My device comprises a casing 2, having a front cover 4 removably secured thereto as by means of screws 6. Casing 2 is open to the atmosphere through vents 5 and 44 in the front and top thereof. The floor 8 of casing 2 is provided with a threaded opening 10 whereby the casing can be screwed or otherwise secured to an air valve component of a steam heating radiator. Opening 10 is provided with a roof or dome-shaped housing 12, defining a second casing having an opening 14 therein in communication with the interior of the main casing 2.

A guide bar or rod 16 is provided, slidably mounted on the top of casing 2, which bar 16 has secured near the top thereof a flat spring strip 18, as by means of bolts 20. A plug of a suitable soft substance 22 is secured to the lower free end 24 of spring 18, and bears against vent 14 to normally close same. A collar 26 is provided, fitting about the bar 16 and spring 18, which collar is vertically slidable up and down rod 16, and means are provided, as by threaded bolt 28, for adjusting the collar 26 in any desired position along the length of the rod 16. Front cover 4 has a longitudinal opening 5 therein through which bolt 28 projects, and the bolt may be provided with an indicator 30 to cooperate with a suitable scale 32 secured onto the cover. Scale 32 may be shifted vertically, as desired, to set same for any particular installation. Vertical movement of collar 26 up and down bar 16 varies the tension of the free end 24 of the spring 18 against the dome vent 14.

I provide, also, a second adjustment in a transverse direction to the first adjustment to vary this spring tension through the top of casing 2. Bar 16 has formed thereon a right angle extension 40 to which threaded bolts 42 are secured. Bolts 42 project upward through slot 44 in the roof of casing 2, and the bar 16 can be moved forward and backward and secured in any desired position by means of these bolts 42. It will be seen that I have thus provided, in my device, a plurality of means adjustable in transverse directions with respect to each other to vary the pressure of spring 18 against opening 14. Normally, the adjustment through movement of extension 40 and bolts 42 is predetermined and the rod 16 locked in the desired position.

My device operates as follows: As soon as sufficient pressure is produced to overcome the tension of spring 18, the free end 24 thereof is forced away from vent 14 to allow steam escape into casing 2 and into the room. It is thus seen that for any one pressure against spring 18, the amount of steam escaping through vent or port 14 depends on the tension of spring 18 exerted against vent or port 14 through the substance 22. Also, for any one position of collar 26, a definite tension can be secured of spring 18 against vent 14, the amount of steam vented depends on the pressure against the vent or port 14.

The benefits to be derived from the use of my invention are numerous, since the amount of escaping steam can be determined easily and quickly through my double adjustment.

I claim:

A device for attachment to steam heating radiators comprising a casing open to the atmosphere, a second casing within the first casing having an opening therein defining a communication between the casings, means on said second casing to secure said device to a steam heating radiator, means to normally close said opening in the second casing comprising a spring-supported plug bearing against the same, and a plurality of means adjustable in transverse directions with respect to each other to increase the spring pressure against said opening, said spring being responsive to fluid pressure changes in said second casing to vary the size of the said opening therein.

GUSTAVE LEVY.